Jan. 24, 1928.
R. G. SANDS
LIGHTNING ARRESTER
Filed Sept. 11, 1925
1,656,989
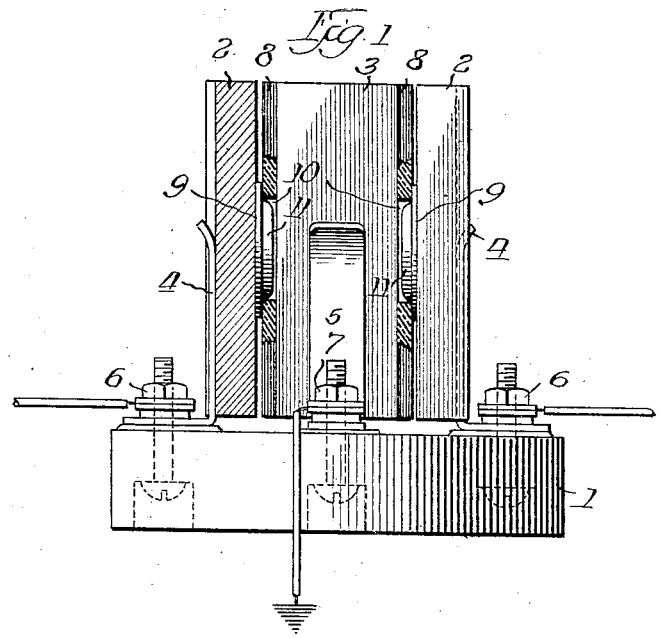
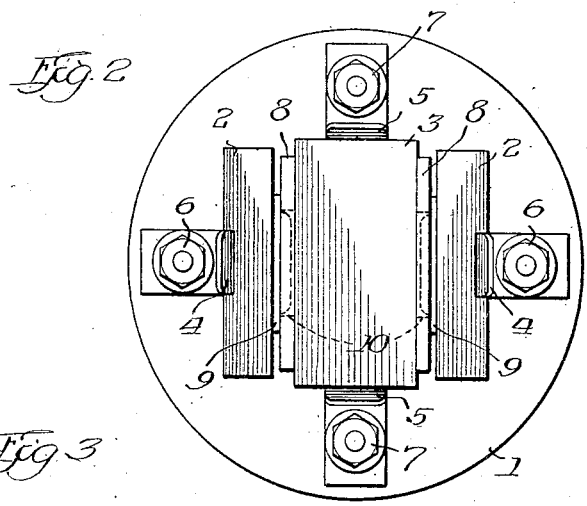
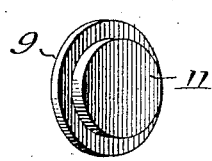
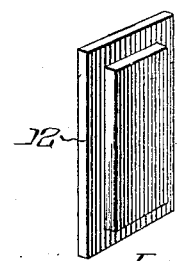
Inventor
Roy G. Sands Patented Jan. 24, 1928.

1,656,989

UNITED STATES PATENT OFFICE.

ROY G. SANDS, OF WAUKEGAN, ILLINOIS.

LIGHTNING ARRESTER.

Application filed September 11, 1925. Serial No. 55,686.

My invention relates to lightning arresters, and particularly to such as are used on telephone circuits.

One of the objects of the invention is to provide a simple, practical and efficient form of lightning arrester.

Another object of the invention is to arrange for the automatic closing of the circuit when lightning or a high potential intrudes upon the circuit, and also for automatically opening the circuit when such lightning or high potential leaves the circuit.

Other objects of the invention will appear and be pointed out hereinafter.

In the accompanying drawings Fig. 1 is a side elevation partly in section of a lightning arrester embodying my invention;

Fig. 2 is a top plan view of the same;

Fig. 3 is a view of a detail of construction; and

Fig. 4 is a view of a modified form of Fig. 3.

Referring to the drawings, I show a lightning arrester comprising a base 1, a pair of line electrodes 2—2, preferably carbon or graphite and a ground electrode 3 located between the line electrodes 2—2. The line electrodes 2—2 are held in position by contact strips 4—4 and the ground electrode is held in position by contact strips 5—5, connecting screws 6—6 being provided for the line electrodes and connecting screws 7—7 for the ground electrode.

Between each line electrode 2 and the central ground electrode 3 are preferably interposed suitable strips 8 of dielectric material such as mica, and there are also preferably employed suitably shaped heat susceptible members 9—9 adapted to co-operate with the electrodes 2—2 and 3 and dielectric strips 8—8 so as to make contact between the electrodes and thereby ground the circuit when lightning or a high potential intrudes upon it. To such end the strips 8—8 are preferably provided with apertures 10—10 and the buttons or members 9—9 with projecting portions 11—11 adapted to fit into the apertures 10—10, but said portions 11—11 do not normally contact with the ground electrode 3. Said members 9—9 are preferably composed of two different kinds of material so that when said members are heated they will buckle or bend and this will cause them to contact with the central electrode 3, thereby establishing connections between one or both of the electrodes 2—2 and the central electrode 3, and thereby closing the circuit.

In this way the lightning arrester normally maintains an open circuit by reason of the space or gap between the member 9 and the central electrode 3. But when lightning or a high potential intrudes upon the line, thereby heating the heat expansion unit or members 9—9, or one of them, said member or members buckle sufficiently to make contact with the central electrode 3 and thereby close one or both sides of the circuit, consequently grounding same and allowing the lightning or high potential quickly to escape into the ground. After this the device cools off and the heat expansion units or members 9—9 straighten out and resume their normal condition, thereby again opening the circuit by forming a space between said members 9—9 and the central member 3 and consequently the device automatically restores normal circuit conditions without requiring any mechanic or lineman to repair the lightning arrester or go out on the circuit for repairs.

In Fig. 4 I show a heat expansion unit 12 of somewhat modified shape, showing how this device may be varied in construction.

It will be understood that changes and modifications may be made without departing from the spirit of the invention.

What I claim is:

1. A lightning arrester having separated electrodes, and also having a device interposed between said electrodes, said device being adapted to maintain an air gap between itself and one of said electrodes, and also adapted to close said gap upon the passage of an arc, and to open said gap upon the discontinuance of said arc.

2. A lightning arrester having separated electrodes and a bimetallic heat responsive device interposed between said electrodes and adapted to maintain an air gap between itself and one of the electrodes, and also adapted to change its form upon the passage of an arc to close the gap, and also adapted to again change its form so as to establish an air gap upon the discontinuance of said arc.

3. A lightning arrester having line and ground electrodes and also having a heat expansion unit interposed between said electrodes and adapted to maintain a circuit opening or gap normally between said electrodes, but arranged to bend or buckle and so close said gap and make connection between said electrodes when said heat expansion unit is heated and to bend so as to again produce a gap when said unit is cooled.

4. A lightning arrester comprising line and ground electrodes, a dielectric between said electrodes, said dielectric being provided with an aperture, and a heat expansion unit, also between said electrodes and adapted to enter said aperture in said dielectric, but to maintain the circuit normally open, said unit being composed of different materials so that it will bend or buckle when heated and thereby close the circuit between said electrodes and also bend to again open the circuit when cooled.

5. A lightning arrester having separated electrodes and a removable device interposed between said electrodes and adapted normally to maintain an air gap between itself and one of the electrodes, and also adapted to close said air gap so as to establish a short circuit between said electrodes upon the prevalence of an arc between said electrodes and also adapted to create an air gap between the electrodes upon the discontinuance of said arc.

6. A lightning arrester having separated electrodes, one of which is slidably mounted, and a heat responsive device slidably mounted between said electrodes, said device being adapted to form an air gap between itself and one of said electrodes, and also adapted to change form to close said air gap when heated by the prevalence of an arc passing over said gap, and also adapted to again change form to establish an air gap on the discontinuance of said arc.

7. A lightning arrester having separated electrodes one of which is in the form of a slidably mounted carbon material block, and a heat responsive circuit closing and opening device slidably mounted between said electrodes and adapted to cooperate therewith.

8. A lightning arrester having separated electrodes one of which is in the form of a slidably mounted carbon material block, and a bimetallic circuit closing and opening device slidably mounted between said electrodes, and a dielectric carrying said heat responsive device.

In witness whereof, I hereunto subscribe my name this 26th day of August, 1925.

ROY G. SANDS.